US012486756B2

(12) United States Patent
Moss, Jr. et al.

(10) Patent No.: US 12,486,756 B2
(45) Date of Patent: Dec. 2, 2025

(54) METHODS FOR PROVIDING ONE OR MORE POSITIONING INDICATORS VIA AN IMAGE CAPTURE DEVICE AND RELATED SYSTEMS (71) Applicant: Baker Hughes Oilfield Operations LLC, Houston, TX (US)

(72) Inventors: William A. Moss, Jr., Conroe, TX (US); Eliah Everhard, The Woodlands, TX (US); Saravanan Hiriaraman, The Woodlands, TX (US); James Herbert May, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 314 days.

(21) Appl. No.: 18/302,590

(22) Filed: Apr. 18, 2023

(65) Prior Publication Data
US 2024/0352846 A1   Oct. 24, 2024

(51) Int. Cl.
E21B 47/002 (2012.01)
G06T 7/62 (2017.01)
G06T 7/70 (2017.01)
G06T 15/00 (2011.01)
H04N 23/50 (2023.01)
H04N 23/60 (2023.01)

(52) U.S. Cl.
CPC ......... *E21B 47/0025* (2020.05); *G06T 7/62* (2017.01); *G06T 15/005* (2013.01); *H04N 23/555* (2023.01); *H04N 23/64* (2023.01); *G06T 7/70* (2017.01); *G06T 2207/20212* (2013.01); *G06T 2207/30164* (2013.01); *G06T 2207/30181* (2013.01); *G06T 2215/16* (2013.01)

(58) Field of Classification Search
None
See application file for complete search history.

(56) References Cited

U.S. PATENT DOCUMENTS 9,465,129 B1 * 10/2016 Olsson ............... G01V 3/15
11,486,836 B1 * 11/2022 Diaz ................. G01N 23/04
2016/0119591 A1   4/2016 Samuel
2017/0218749 A1 * 8/2017 Lee ................. E21B 47/005
(Continued)

FOREIGN PATENT DOCUMENTS

CN   217276013   8/2022

OTHER PUBLICATIONS

International Search Report for Application No. PCT/US2024/024725 dated Aug. 12, 2024, 3 pages.
(Continued)

*Primary Examiner* — Miya J Cato
(74) *Attorney, Agent, or Firm* — Baker Hughes Company (57) ABSTRACT A system may include an earth-boring tool, an image capture device, at least one processor, and at least one non-transitory computer-readable medium. The system may obtain a three-dimensional representation of an earth-boring tool and provide one or more positioning indicators to a user via the image capture device responsive to the geometry position data. The system may also generate a two-dimensional image of the earth-boring tool and perform object detection on the generated two-dimensional image to identify one or more geometrical features represented in the generated two-dimensional image.

20 Claims, 8 Drawing Sheets

(56) References Cited

U.S. PATENT DOCUMENTS

| | | |
|---|---|---|
| 2021/0156121 A1 | 5/2021 | Hayakawa et al. |
| 2022/0018241 A1 | 1/2022 | Affleck et al. |
| 2022/0172406 A1* | 6/2022 | Mueller .............. G01C 11/025 |
| 2022/0275687 A1 | 9/2022 | Xu et al. |

OTHER PUBLICATIONS

International Written Opinion for Application No. PCT/US2024/024725 dated Aug. 12, 2024, 4 pages.

* cited by examiner

METHODS FOR PROVIDING ONE OR MORE POSITIONING INDICATORS VIA AN IMAGE CAPTURE DEVICE AND RELATED SYSTEMS

TECHNICAL FIELD

Embodiments of the present disclosure relate generally to systems and methods for guiding the positioning of an image capture device.

BACKGROUND

Wellbores are formed in subterranean formations for various purposes including, for example, the extraction of oil and gas from a subterranean formation and the extraction of geothermal heat from a subterranean formation. A wellbore may be formed in a subterranean formation using a drill bit, such as, an earth-boring rotary drill bit. Different types of earth-boring rotary drill bits are known in the art, including, for example, fixed-cutter bits, drag bits, rolling-cutter bits (which may be referred to as "rock" bits), impregnated bits (impregnated with diamonds or other superabrasive particles), and hybrid bits (which may include, for example, both fixed cutters and rolling cutters).

Various geometrical features of a drill bit may be inspected to assess wear of the bit and the drill bit may be inspected and graded according to the wear it has sustained in a standardized process called "bit dull grading." The evaluation of drill bits is useful to help improve bit type selection according to the type of subterranean formations that are to be drilled, to know when to replace a drill bit because its useful life has been exhausted, and to improve future bit designs and performance.

BRIEF SUMMARY

Some embodiments of the present disclosure include a method. The method may include obtaining a three-dimensional representation of an earth-boring tool, calculating one or more target image capture device positions relative to the three-dimensional representation of an earth-boring tool, providing, to a user via an image capture device, one or more positioning indicators configured to guide a user to position the image capture device at one of the one or more target image capture device positions relative to an earth-boring tool, generating a two-dimensional image of the earth-boring tool via the image capture device, performing object detection on the generated two-dimensional image of the earth-boring tool to generate one or more bounding boxes indicating a position of a geometrical feature of the earth-boring tool, and identifying one or more geometrical features of the earth-boring tool responsive to a comparison of the one or more bounding boxes and the one or more positioning indicators.

Further embodiments of the present disclosure include a system. The system may include an earth-boring tool, an image capture device configured to obtain one or more two-dimensional images, at least one processor, and at least one non-transitory computer-readable storage medium. The at least one non-transitory computer-readable storage medium may store instructions thereon that, when executed by the at least one processor, cause the system to: obtain a three-dimensional representation of an earth-boring tool, calculate one or more target image capture device positions relative to the position data, provide, to a user via the image capture device, one or more positioning indicators configured to guide a user to position the image capture device at one of the one or more target image capture device positions relative to the earth-boring tool, the positioning indicators based, at least in part, on the geometry position data and the one or more target image capture device positions, generate one or more two-dimensional images via the image capture device, perform object detection on the generated two-dimensional image of the earth-boring tool to generate one or more bounding boxes, each bounding box indicating a position of a geometrical feature of the earth-boring tool represented in the generated two-dimensional image, and identify one or more geometrical features of the earth-boring tool based, at least in part, on a the one or more bounding boxes and the geometric position data.

Still further embodiments of the present disclosure include a system. The system may include an earth-boring tool and an image capture device configured to obtain one or more two-dimensional images. The image capture device may include at least one processor and at least one non-transitory computer-readable storage medium storing instructions thereon that, when executed by the at least one processor, cause the image capture device to obtain one or more positioning indicators configured to guide a user to position the image capture device relative to the earth-boring tool, and provide the one or more positioning indicators to a user via the image capture device.

BRIEF DESCRIPTION OF THE SEVERAL VIEWS OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Downhole drilling operations may involve the use of an earth-boring tool at the end of a long string of pipe commonly referred to as a drill string. An earth-boring tool may be used for drilling through subterranean formations, such as rock, dirt, sand, tar, etc. In some cases, the earth-boring tool may be configured to drill through additional elements that may be present in a wellbore, such as cement, casings (e.g., a wellbore casing), discarded or lost equipment (e.g., fish, junk, etc.), packers, etc. Each element will cause various parts of the earth-boring tool to wear or break down from the act of drilling through them. As various parts of the earth-boring tool wears down, it becomes increasingly likely that at least a part of the earth-boring tool will break, which may sometimes lead to part of, or all of an earth-boring tool being dislodged from the drill string and becoming irretrievably lost within the wellbore. This may result in significant losses of time as well as the loss of expensive equipment, which may both reduce the efficiency of the drilling operation and require complete replacement of expensive drilling equipment.

To prevent this, bits may be routinely inspected for wear in a process called "dull grading." Dull grading may involve measuring and quantifying wear states of various geometrical features of a drill bit. For example, dull grading may involve inspecting various cutting elements of a drill bit to assess whether the elements need to be repaired or replaced. Dull grading also offers various insights to improve future drilling operations. For example, the distribution of wear of each cutting element of an earth-boring tool across various drilling operations may reveal what types of rock formations tend to cause increased wear on certain types of cutting elements compared to other types of cutting elements. This analysis may enable more proactive planning for future drilling operations to improve earth-boring tool (e.g., drill bit) performance while decreasing repair or replacements of earth-boring tools or geometrical features of the earth-boring tools, which may be both time intensive and costly.

In some cases, dull grading may be done using digital dull grading software using various computer vision algorithms. The digital dull grading software may analyze a two-dimensional image of a drill bit and identify geometrical features of the drill bit as well as various dull states of those geometrical features. For example, the digital dull grading software may be in the form of a dull grading machine learning model that may take as input an image of a drill bit and may be configured to output various parameters relating to wear (e.g., cutter wear) and dull characteristics of the earth-boring tool. However, the images input into the dull grading software may have to be taken manually by a user, which may lead to images that are incomplete or that may make it difficult for the dull grading software to identify the various geometrical features of the drill bit to correctly associate dull grading information with particular features (e.g., cutters) of the drill bit.

In accordance with this disclosure, a system may be provided for guiding a user to take photographs from an appropriate position and orientation to capture a two-dimensional image of an earth-boring tool, such as a drill bit, for use by dull grading software. The system may also enable more accurate identification of various features within a two-dimensional image of a drill bit. For example, the system may generate or otherwise obtain a three-dimensional representation of a drill bit. The system may use this three-dimensional representation of a drill bit to calculate a target position for an image capture device. The target position may represent a three-dimensional spatial position as well as an orientation of an image capture device configured to provide a desired view of a drill bit when capturing a two-dimensional image (e.g., an image to be used as input to dull grading software) with the image capture device. The system may then use the three-dimensional representation of a drill bit and/or a target position for an image capture device to generate one or more positioning indicators for use by the image capture device to guide a user to orient the image capture device relative to a physical drill bit to capture in image of the physical drill bit to be analyzed by dull grading software. Positioning indicators may also include one or more identifiers for identifying geometrical features of the three-dimensional representation of a drill bit. A user may then use the image capture device to generate a two-dimensional image of a physical drill bit responsive to the one or more positioning indicators. The system may then perform object detection on the generated two-dimensional image to detect one or more geometrical features (e.g., cutting elements) of the drill bit represented in the generated two-dimensional image. The result of the object detection may then be compared to the positioning indicators (e.g., the identification information included in the positioning indicators) to identify the geometrical features of the two-dimensional image. By guiding the user to position and orient the image capture device, the system enables higher quality images to be used by dull grading software to not only generate more accurate dull grading information, but also to be able to identify geometrical features of the drill bit and tie it to the dull grading information generated by the dull grading software. By improving the accuracy of tying wear data produced by dull-grading software to particular geometric features (e.g., cutting elements) of a drill bit, it may be easier to identify wear trends across a drill bit for specific types of drilling conditions to better inform future drilling operations, which may reduce repairs and replacements of costly equipment. Furthermore, the improved dull grading information may enable the system to change one or more drilling parameters to improve the lifespan of an earth-boring tool (e.g., a drill bit).

Figure 1:
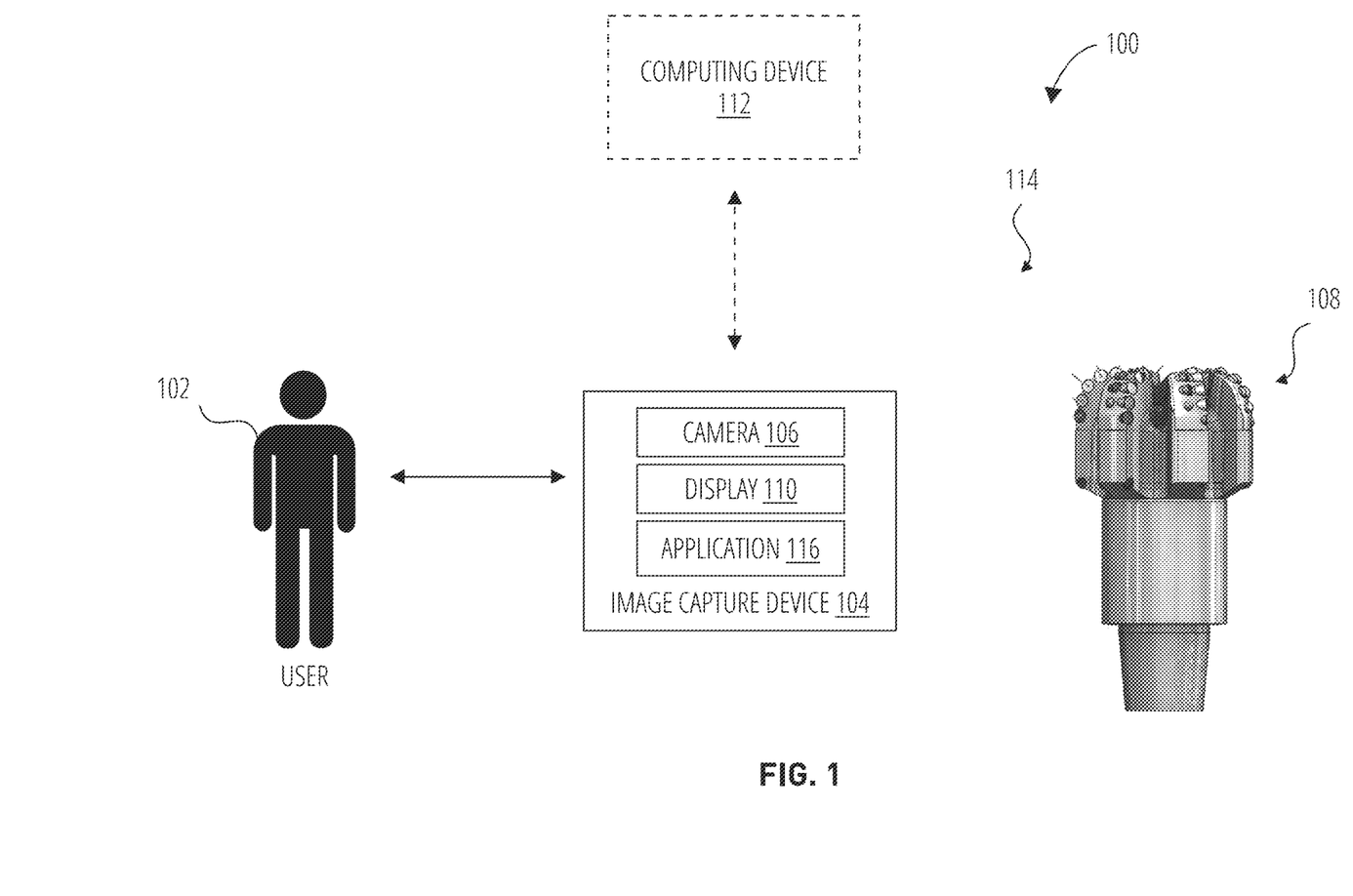
FIG. 1 illustrates a schematic representation of an environment in which a system for capturing a two-dimensional image of an earth-boring tool can operate according to one or more embodiments of the present disclosure.

FIG. 1. Illustrates a schematic representation of an environment 100 in which a system 114 for capturing a two-dimensional image of an earth-boring tool (e.g., earth-boring tool 108) can operate according to one or more embodiments of the present disclosure. As illustrated, the environment 100 may include a user 102, and a system 114 for capturing a two-dimensional image of a drill bit. The system 114 may include an image capture device 104, an earth-boring tool 108, and optionally a computing device 112. The image capture device 104 may include a camera 106 and a display 110.

The camera 106 may be configured to capture or record one or more two-dimensional images. For example, the camera 106 may capture a single two-dimensional image or a series of two-dimensional images (e.g., a video). The display 110 may be configured to display one or more two-dimensional images captured by the camera 106. For example, the camera may capture a live-camera feed where the live-camera feed is shown on the display 110.

The user 102 may interface with the image capture device 104. For example, the user 102 may position and orient the image capture device 104 as well as use the image capture device 104 to capture (e.g., record) one or more two-dimensional images in the form of a single image or a video. The captured image or video may then be stored locally on the image capture device 104 or stored remotely on a remote computing device (e.g., computing device 112). The user 102 may be an individual (i.e., a human user), a business, a group, or any other entity.

The image capture device 104 device may be in communication with the computing device 112. For example, the image capture device 104 may configured to send and receive data to and from the computing device 112. In some embodiments, the image capture device 104 may communicate with the computing device 112 over a wireless connection. For example, in some embodiments the computing device 112 may be remote from the image capture device 104 and communicate with the image capture device 104 via a network. A network may include a combination of cellular or mobile telecommunications networks, a public switched telephone network (PSTN), and/or the Internet or World Wide Web and facilitates the transmission of audio and/or video signals between the image capture device 104 and the computing device 112. The network, may include various other types of networks that use various communication technologies and protocols, such as a local area network (LAN) (e.g., a wired local area network), a wireless local network (WLAN), a wide area network (WAN), a metropolitan area network (MAN), other telecommunication networks, or a combination of two or more of the foregoing networks.

The image capture device 104 and the computing device 112 may represent various types of computing devices with which a user can interact. For example, the image capture device and may be a mobile device (e.g., a cell phone, a smartphone, a PDA, a tablet, a laptop, a watch, a wearable device, digital camera, camcorder, etc.) so long as the mobile device includes a camera. The image capture device 104 may also be a non-mobile device such as a desktop that includes a camera (e.g., a webcam). In some embodiments the computing device 112 may be a mobile device as described above or a non-mobile device (e.g., a desktop or server).

Figure 8:
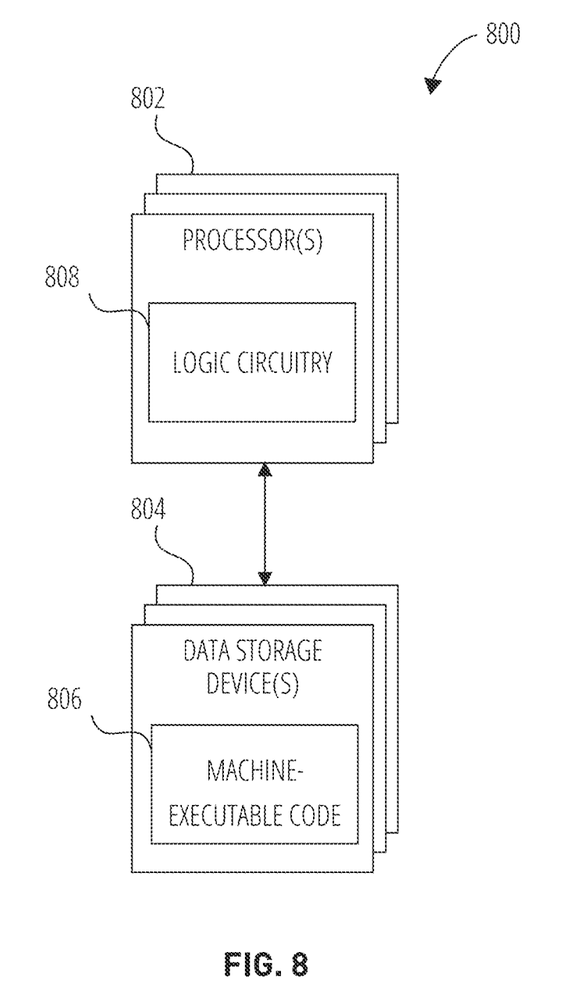
FIG. 8 is a block diagram of circuitry that, in some examples, may be used to implement various functions, operations, acts, processes, and/or methods disclosed herein.

The system 114 may also include a processor and memory (discussed in more detail with regard to FIG. 8). In one or more embodiments, the processor includes hardware for executing instructions, such as those making up a computer program. The memory may be used for storing data, metadata, and programs for execution by the processor(s). The display 110 may be in the form of a touch screen and may allow a user 102 to provide input to, receive output from, and otherwise transfer data to and receive data from the computing device 112 or any number of other devices capable of receiving data.

In some embodiments, the image capture device 104 may include an application 116 installed thereon. The application 116 may facilitate the transfer of various forms of data (e.g., image data, audio data, etc.) between the image capture device 104 and the computing device 112. In particular, the image capture device 104 may execute one or more applications for performing the functions of the various embodiments and processes described herein. For example, in some embodiments the application may be configured to guide a user to position and orient the image capture device 104 to a target position and orientation relative to an earth-boring tool (e.g., earth-boring tool 108) to capture a desired image or video of the earth-boring tool. In some embodiments, the application 116 may be executed via a web browser on the image capture device 104. In some embodiments, the application 116 may be local to the image capture device 104. In other embodiments, the application 116 may be stored and/or at least partially operated via a cloud computing service.

In some embodiments, the application 116 may provide to a device (e.g., the image capture device 104) a Graphical User Interface (GUI) to be presented on a display of the device. The GUI may display to a user 102 various options for interacting with the application 116. For example, the GUI may be configured to present one or more images or indicators to guide a user to position and orient the image capture device 104 relative to the earth-boring tool 108. In some embodiments the application 116 may provide positioning and/or orientation indicators using audio via a speaker of the image capture device 104 with or without accompanying images or indicators presented via the GUI. In some embodiments, the application 116 may access the camera 106 of the image capture device 104 to display both a live camera-feed of the camera 106 as well as a GUI, as discussed in more detail below with regard to FIG. 2.

In some embodiments, application 116 may be a native application installed on the image capture device 104. For example, the application 116 may be a mobile application that installs and runs on a mobile device, such as a smart phone or a tablet. In some embodiments, the application 116 facilitates capture of image information as well as communicating audio or visual prompts to the user 102 to guide the user 102 to position and orient the image capture device 104 relative to the earth-boring tool 108 to match a target position and orientation relative to the earth-boring tool 108.

Figure 2:
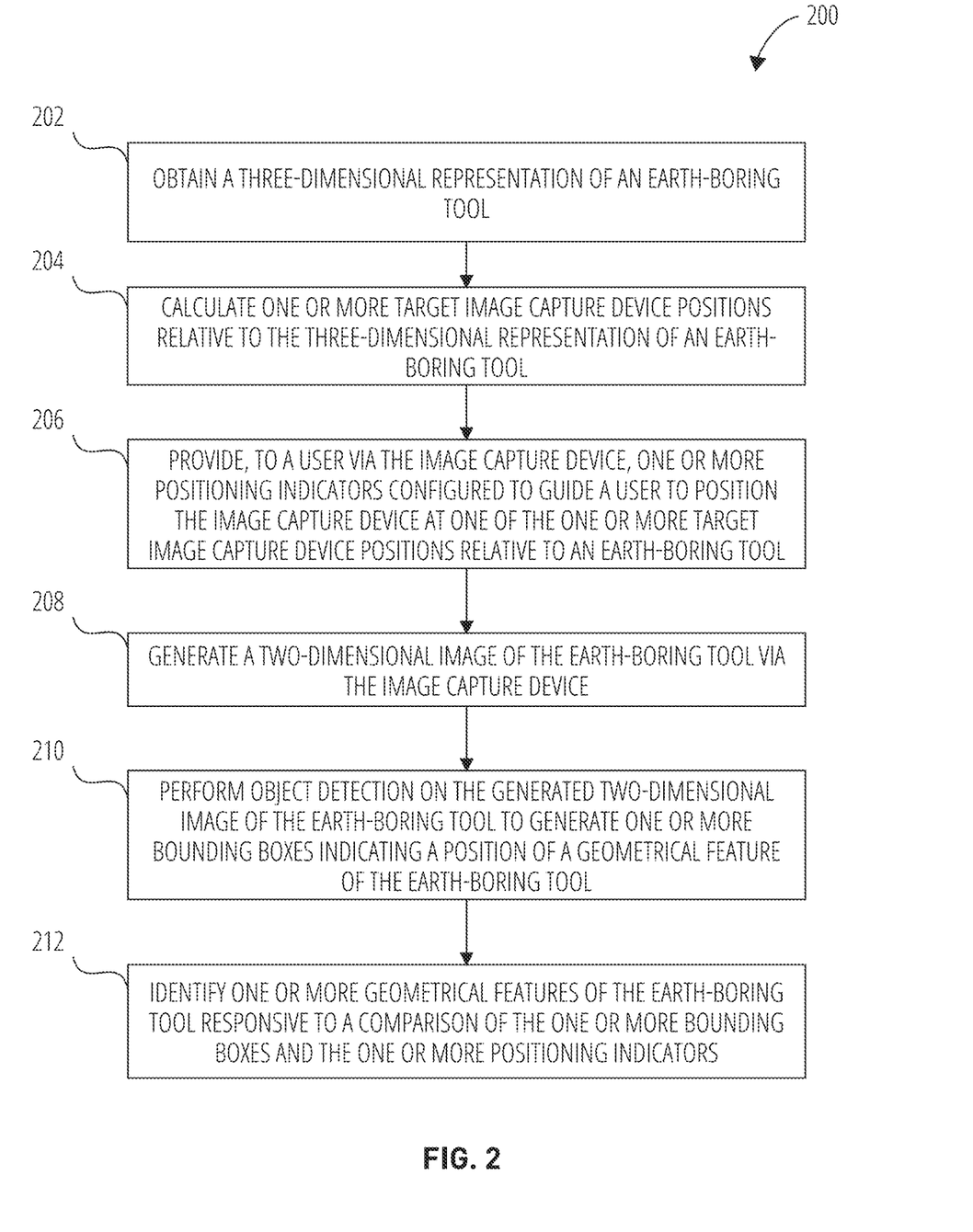
FIG. 2 illustrates a sequence-flow that a system can use to facilitate the capture of a two-dimensional image and identify one or more geometrical features represented in the two-dimensional image according to one or more embodiments of the present disclosure.

FIG. 2 illustrates a sequence-flow diagram 200 that a system 114 can use to facilitate the capture of a two-dimensional image and identify one or more geometrical features represented in the two-dimensional image. The various operations shown in diagram 200 may be described with reference to FIG. 1.

Referring to the diagram 200, the system 114 may obtain a three-dimensional representation of an earth-boring tool, as shown in operation 202. For example, the three-dimensional representation of an earth-boring tool may be in the form of an engineering design model or three-dimensional data obtained from scanning a physical earth-boring tool (e.g., point cloud data). However, any representation of an earth-boring tool (e.g., a drill bit) may be used so long as the data may be used or manipulated to represent a three-dimensional object (e.g., a flat file with image data using a cylindrical coordinate system). In some embodiments, the three-dimensional representation may be generated by the image capture device 104 or the computing device 112 based one or more two-dimensional images. In other embodiments, the three-dimensional representation may be received by the image capture device 104 or the computing device 112 via a remote device (e.g., a remote server). The three-dimensional representation of a drill bit may include geometry position data may represent positions in X, Y, Z coordinates of various features of the three-dimensional representation of an earth-boring tool. For example, the geometry position data may include the position and geometrical data for one or more cutting elements represented in the three-dimensional representation. The geometry position data may also include one or more identifiers for identifying geometrical features of the three-dimensional representation of an earth-boring tool. For example, each cutting element represented in a three-dimensional representation of an earth-boring tool may have an associated identifier differentiating it from other cutting elements represented in the three-dimensional representation.

At operation 204, the system 114 calculates one or more target image capture device positions relative to the three-dimensional representation of an earth-boring tool. Each of the one or more target image capture device positions may include a target position and orientation for the image capture device 104 based on a virtual camera projection view. For example, a target image capture device position may be a position at which features represented in the geometry position data are known to be in view of the virtual camera projection view. For example, the target image capture device position may be calculated based on the position of one or more features represented in the three-dimensional image representation and a center projection vector of a virtual camera such that the projection view of the virtual camera contains the one or more features while reducing obstructions of the one or more features.

At operation 206, the system 114 may provide, to a user via the image capture device, one or more positioning indicators configured to guide a user to position the image capture device at one of the one or more target image capture device positions relative to an earth-boring tool (e.g., earth-boring tool 108). In some embodiments, the one or more positioning indicators may be in the form of a two-dimensional overlay image. For example, in some embodiments the system 114 may generate a two-dimensional overlay image responsive to projecting the three-dimensional representation of an earth-boring tool (e.g., geometry position data of the three-dimensional representation of an earth-boring tool) onto a two-dimensional plane. For example, after a target image capture device position is calculated using a virtual camera, the three-dimensional data defining the one or more cutting elements may be projected (e.g., an orthogonal or perspective projection) onto a two-dimensional plane that is orthogonal to a center projection vector of the virtual camera to generate a two-dimensional representation of the one or more cutting elements. The edges of the cutting elements represented in the two-dimensional image may then be defined using conventional edge detection, image filtering, or image processing techniques to define outlines of one or more cutting elements. The resulting image may represent outlines of the one or more cutting elements from the perspective of the virtual camera where the camera is at the target position (e.g., spatial position and orientation relative to a three-dimensional representation of an earth-boring tool), which may be used as an "overlay" image, as discussed in more detail below with regard to FIGS. 3 and 4.

The overlay image may then be provided over a real-time camera feed of the image capture device 104 via the display 110. After the overlay image has been provided over a real-time camera feed of the image capture device 104, the user 102 may orient and position the image capture device 104 relative to the earth-boring tool 108 to match the positions of the one or more cutting elements represented in the overlay image with the positions of one or more cutters included on the earth-boring tool 108. In this way, the overlay image may guide the user to capture a two-dimensional image of the earth-boring tool 108 at the target position of the image capture device by lining up the outlines of, for example, the one or more cutting elements represented in the overlay image to match the general geometric shape of one or more cutting elements of the earth-boring tool 108.

In some embodiments, the one or more positioning indicators may be provided to a user via the image capture device 104 responsive to real-time object detection. For example, the image capture device 104 may use real-time object detection to detect various features of the earth-boring tool 108 including geometric features, color, contrast, identification markers. In some embodiments, the object detection may be done by using data from the three-dimensional representation of an earth-boring tool. For example, the image capture device 104 may, via application 116, detect various features of the earth-boring tool 108 that are captured by the live-camera feed of the image capture device 104. One or more geometric features of the three-dimensional representation of an earth-boring tool or the geometric position data may then be aligned with the detected features of the earth-boring tool 108 to calculate a target position and orientation of the image capture device 104 with respect to the earth-boring tool 108 where the image capture device 104 may, via application 116, detect its position relative to the earth-boring tool 108. The application 116 may generate one or more positioning indicators responsive to the real-time object detection.

In some embodiments, the one or more positioning indicators may include one or more audible tones. For example, the image capture device 104 may, via application 116, use real-time object detection line up the geometry position data with corresponding geometry of the earth-boring tool 108. The application 116 may then detect when the image capture device 104 comes within a predetermined threshold of distance or orientation from one of the one or more target image capture device positions. When the application 116 detects that the image capture device 104 is within the predetermined threshold, an audible tone may sound. In other embodiments, the application 116 may cause the image capture device 104 to produce a series of audible tones via one or more speakers included in the image capture device 104. The application 116 may cause the series of tones to increase in frequency the closer the image capture device is to the predetermined threshold distance until the image capture device is within the predetermined threshold whereupon a constant tone may be produced for as long as the image capture device 104 is within the predetermined threshold. The application 116 may also cause the image capture device 104 to produce one or more haptic feedback responses (e.g., vibrations). As a specific non-limiting example, the one or more haptic feedback responses may be produced at the same time and interval as the one or more audible tones.

In some embodiments, the one or more positioning indicators may include one or more on screen guides. For example, the application 116 may detect where the image capture device 104 is relative to a target position and a physical earth-boring tool (e.g., earth-boring tool 108). The application 116 may then cause the display 110 to show one or more visual indicators to guide the user to position and orient the image capture device 104. For example, the visual indicators may be in the form of one or more arrows indicating a direction the user must move or turn the image capture device 104 to be within the predetermined threshold distance and orientation of a target position. The application 116 may also cause one or more visual indicators to change responsive to the image capture device 104 coming within the predetermined threshold distance and/or orientation of the target image capture device position. As a specific non-limiting example, the application 116 may cause the display 110 to show an X at some location on the display 110 while the image capture device 104 is outside of the predetermined threshold and may cause the display 110 to replace the X with a check mark when the image capture device 104 is within the predetermined threshold.

In some embodiments, the one or more visual indicators may be in the form of a uniform color tint provided to the display 110 of the image capture device 104. For example, the application 116 may cause the display 110 to overlay the uniform tinted color responsive to the image capture device 104 coming within the predetermined threshold distance of one of the target image capture device positions relative to the earth-boring tool 108. As a specific non-limiting example, the application 116 may cause the display 110 to show a red tint over a live-camera feed of the image capture device 104 when the image capture device 104 is outside of the predetermined threshold and provide a green tint to the display 110 when the image capture device 104 is within the predetermined threshold.

Though discussed in terms of specific examples, one of ordinary skill in the art will appreciate that any overlay or positioning indicator may be used so long as it guides a user to position an image capture device 104 to capture an image containing features of an earth-boring tool (e.g., earth-boring tool 108) for further analysis from an operator and/or computer program.

At operation 208, the system 114 may generate a two-dimensional image of the earth-boring tool 108 via the image capture device 104. For example, a user may manually capture an image using the image capture device 104 responsive to the one or more positioning indicators. In some embodiments, the application 116 may use real-time object detection to calculate bounding boxes around detected features of the earth-boring tool 108 based on a live-camera feed of the image capture device 104. In some embodiments, the image capture device 104 may automatically capture an image when the image capture device 104, via application 116, detects that the image capture device 104 is within a predetermined threshold of a target position. For example, in the case where the one or more positioning indicators is in the form of a two-dimensional overlay with one or more outlines representative of geometric features of an earth-boring tool, the bounding boxes resulting from real-time object detection may be compared to the overlay image in real-time such that, if the bounding boxes at least substantially correlate to (e.g., overlap) the feature outlines represented in the overlay image, the application 116 may cause the image capture device 104 to automatically capture an image of the earth-boring tool 108.

At operation 210, the system 114 performs object detection on the generated two-dimensional image of the earth-boring tool 108 and generates one or more bounding boxes indicating a position of a geometrical feature of the earth-boring tool 108. In some embodiments, the image capture device 104 may, via the application 116, perform the object detection locally. In other embodiments, the image capture device 104 may send the generated two-dimensional image to the computing device 112 for object detection on the computing device 112. In any case, the object detection may detect one or more features of an object similar to the real-time object detection described above. For example, as a result of object detection, one or more cutting elements of earth-boring tool 108 that are represented in the generated two-dimensional image may be detected and have a bounding box drawn over the detected cutting elements. The bounding box data may then be integrated (e.g., added) into the data of the generated two-dimensional image to indicate areas of the generated two-dimensional image where one or more cutting elements were detected.

At operation 212, the system 114 may identify one or more geometrical features of the earth-boring tool 108 responsive to a comparison of the one or more bounding boxes and the one or more positioning indicators. For example, when the one or more positioning indicators are in the form of an overlay image, the overlay image may contain identification information for various geometrical features of the three-dimensional representation of an earth-boring tool. For example, in the case of cutting elements, the overlay image may contain identification information to differentiate each cutting element represented in the overlay image. The bounding boxes may then be compared to the overlay image to identify each of the cutting elements represented in the generated two-dimensional image. As a specific non-limiting example, the application 116 may identify a cutting element in the generated two-dimensional image where a bounding box of the generated two-dimensional image at least substantially overlaps a cutting element (e.g., an outline of a cutting element) represented in the overlay image when the overlay image is overlaid on the generated two-dimensional image. The identification data for each identified object represented in the generated two-dimensional image may then be integrated (e.g., added) to the data of the generated two-dimensional image.

Furthermore, in some embodiments, the system 114 may measure one or more wear characteristics of at least one geometrical feature of the earth-boring tool 108 based, at least in part, on one or more two-dimensional images generated as described above and the one or more identified geometrical features of the earth-boring tool 108. For example, the generated two-dimensional image including identification information identifying one or more geometrical features of an earth-boring tool may be input into dull-grading software to measure the wear of each identified geometrical feature (e.g., one or more cutting elements of earth-boring tool 108). Because each geometrical feature of the earth-boring tool 108 is identified in the image input into the dull-grading software, the dull-grading software is able to associate a measured wear of a geometrical feature with the correct feature represented in the generated two-dimensional image. This may improve the ability to analyze wear distributions across the features of the earth-boring tool 108 to improve future drilling operations.

Though discussed in terms of obtaining images for dull-grading, one of ordinary skill in the art will appreciate that the images obtained using the various processes described herein may be used in any number of different analyses of an earth-boring tool, such as a drill bit.

Figure 3:
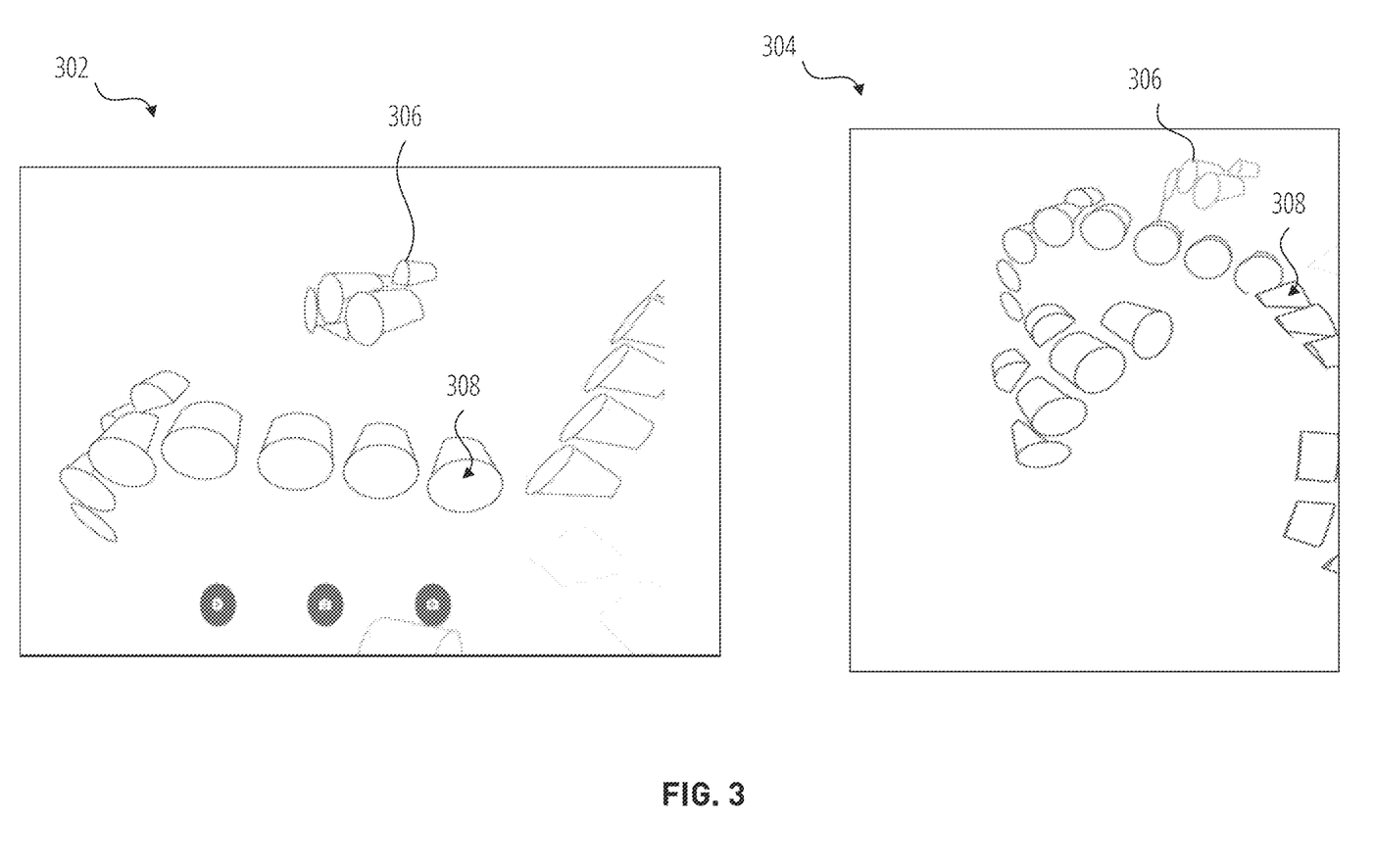
FIG. 3 illustrates a pair of example overlay images that may be presented on an image capture device via a display according to one or more embodiments of the present disclosure.

FIG. 3 shows example overlay images 302 and 304 that may be presented on the image capture device (e.g., image capture device 104 of FIG. 1) via a display (e.g., display 110 of FIG. 1). The overlay images 302 and 304 may include one or more outlines 306 of geometrical features, such as cutting element or blades of an earth-boring tool, as shown in FIG. 3. Overlay images 302 and 304 may include identification information with regard to each geometrical outline represented in each overlay image. For example, cutter outline 308 may have an associated identification different from other cutter outlines represented in overlay images 302 and 304.

Figure 4:
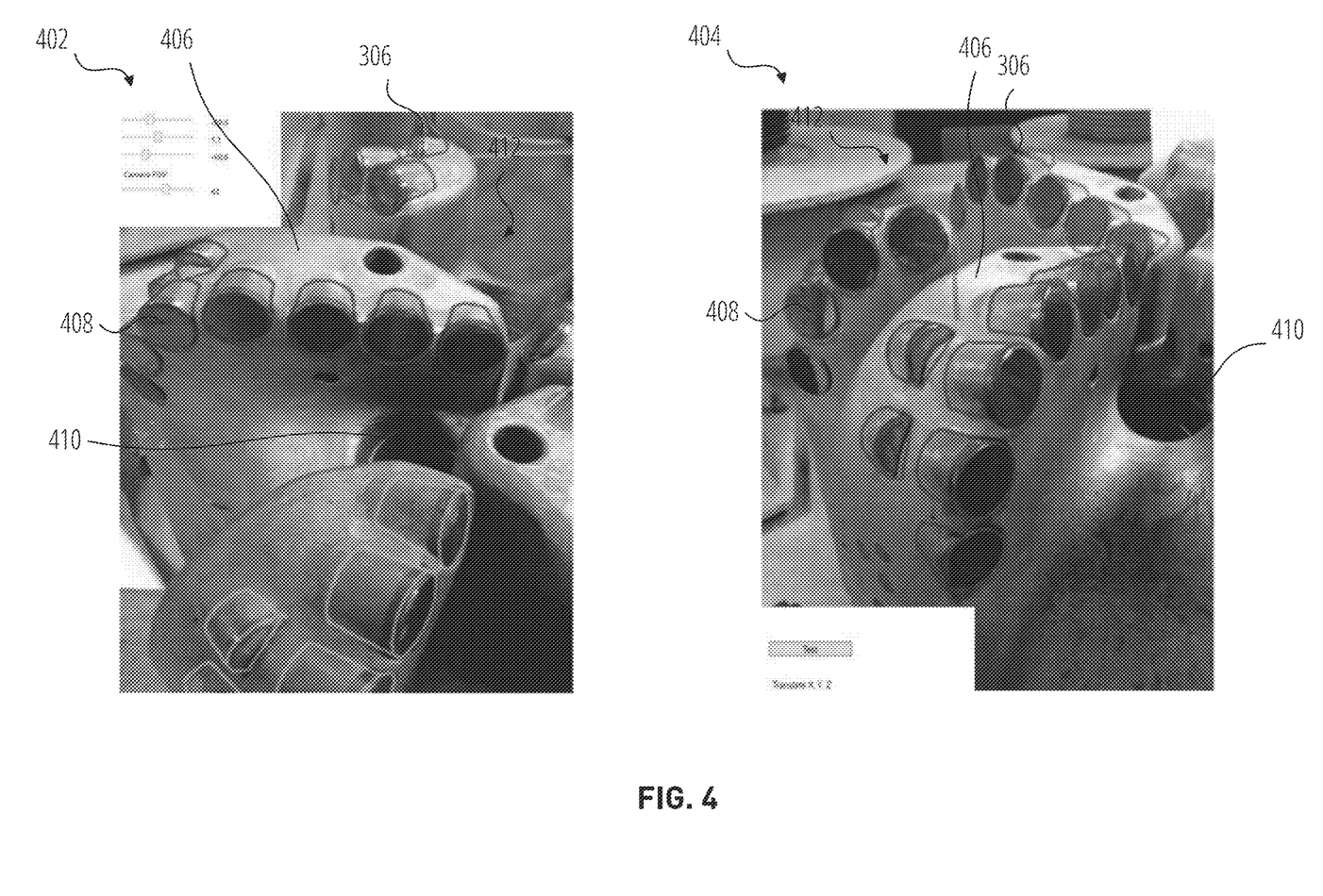
FIG. 4 illustrates a pair of images of a display of an image capture device showing overlay images that include outlines of geometrical features of an earth-boring tool overlaid on a live-camera feed of the image capture device, according to one or more embodiments of the present disclosure.

FIG. 4 shows images 402 and 404 of a display (e.g., display 110) showing overlay images including outlines 306 of geometrical features of an earth-boring tool overlaid on a live-camera feed of an image capture device (e.g., image capture device 104 of FIG. 1), the live-camera feed depicting a drill bit 412. Drill bit 412 may be an example of an earth-boring tool 108 of FIG. 1. Drill bit 412 includes a nozzle 410, a plurality of blades 406 and a plurality of cutting elements 408 disposed within a portion of each of the blades 406. As shown in FIG. 4, a user may orient and position the image capture device 104 to match the geometry outlines of the overlay image with the geometry of an earth-boring tool (e.g., earth-boring tool 108) as shown with respect to the drill bit 412.

Figure 5:
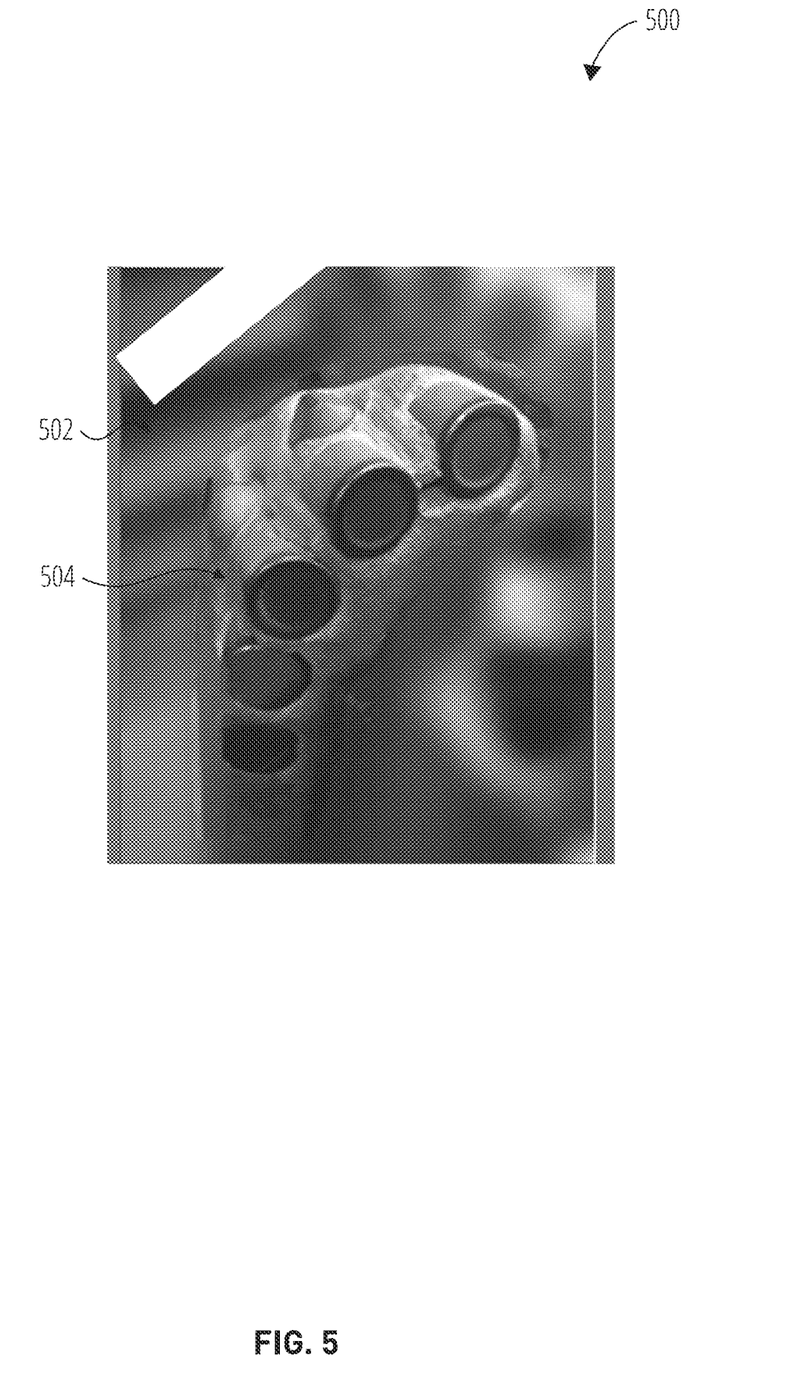
FIG. 5 illustrates an example GUI that may be presented on a display of an image capture device according to one or more embodiments of the present disclosure.

FIG. 5 shows an example GUI 500 that may be presented on the display 110 via the application 116. For example, the GUI 500 may show a live-camera feed and one or more overlay images. An overlay image may be dynamically or statically generated by the application 116 responsive to real-time object detection. For example, the image capture device 104 may, via application 116, automatically detect objects shown in the live-camera feed of the image capture device 104 and generate a focus overlay 502 based on geometric position data provided to the application 116. The application 116 may then generate a target window 504 to display one or more features of an earth-boring tool. For example, application 116 may receive geometric position data containing information regarding a desired geometry of a three-dimensional representation of an earth-boring tool to be captured in a two-dimensional image for later analysis. The application 116 may then use object detection to line up the geometric position data with a physical earth-boring tool (e.g., earth-boring tool 108) represented in the live-camera feed. The application 116 may then automatically and dynamically adjust the size of the target window 504 responsive to the user 102 positioning and orienting the image capture device 104 such that the focus overlay 502 obscures features of an earth-boring tool or the background to guide the user 102 as to which part of the earth-boring tool to capture in an image for further analysis. In other embodiments, the target window 504 may be static with the area outside of the target window 504 obscured, as shown in FIG. 5. Though shown and discussed with regard to manipulating a real-time camera feed by adjusting focus of at least part of a display, any number of conventionally known image processing techniques may be used to guide a user 102 to position the image capture device 104 relative to an earth-boring tool (e.g., earth-boring tool 108).

Figure 6:
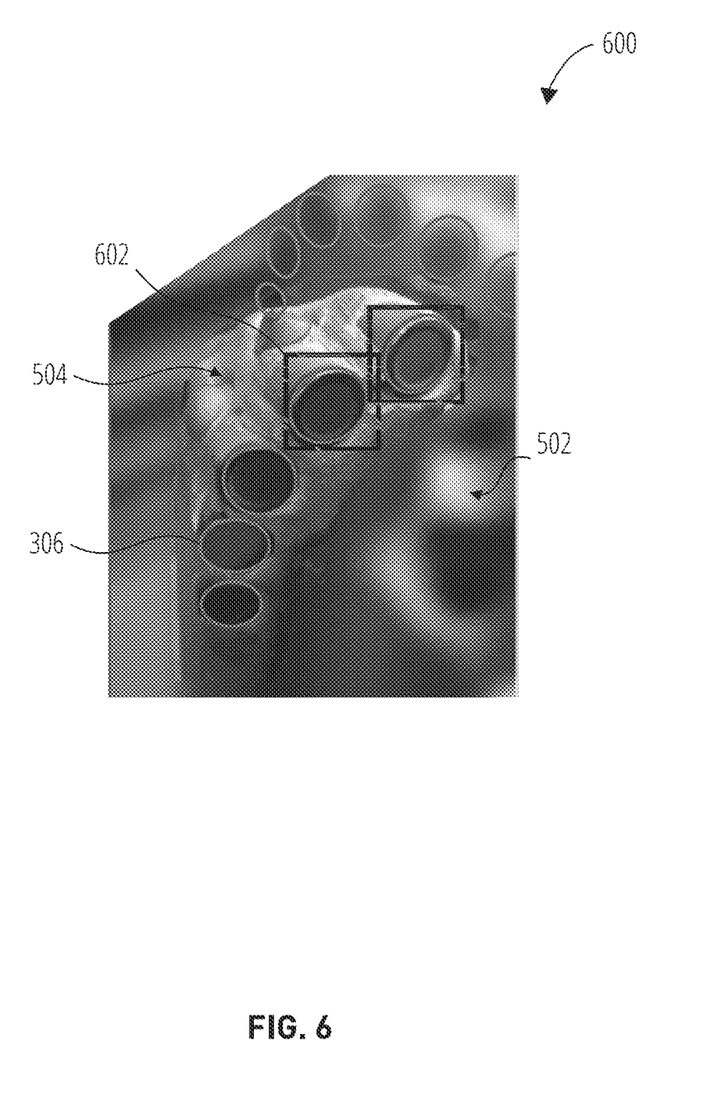
FIG. 6 illustrates an example GUI that may be presented on a display of an image capture device according to one or more embodiments of the present disclosure.

FIG. 6 is an example GUI 600 that may be presented on the display 110 via the application 116. For example, GUI 600 includes a plurality of overlay elements including focus overlay 502, target window 504 outlines 306, and bounding boxes 602. The bounding boxes 602 may be a dynamic overlay image based, at least in part, on real-time object detection. For example, the bounding boxes 602 may surround one or more detected objects shown in a live-camera feed of the image capture device 104 where the position of the bounding boxes may update dynamically responsive to a change in position or orientation of an image capture device. Though shown with three different types of overlays, any number of overlays may be presented via the display 110. Moreover, the image capture device 104 may concurrently display any number of other positioning indicators as discussed above. For example, the image capture device 104 may provide to user 102 one or more of an audio tone, a two-dimensional image overlay, one or more arrows, one or more haptic feedback responses, one or more geometrical bounding boxes, or one or more image processing filters.

Figure 7:
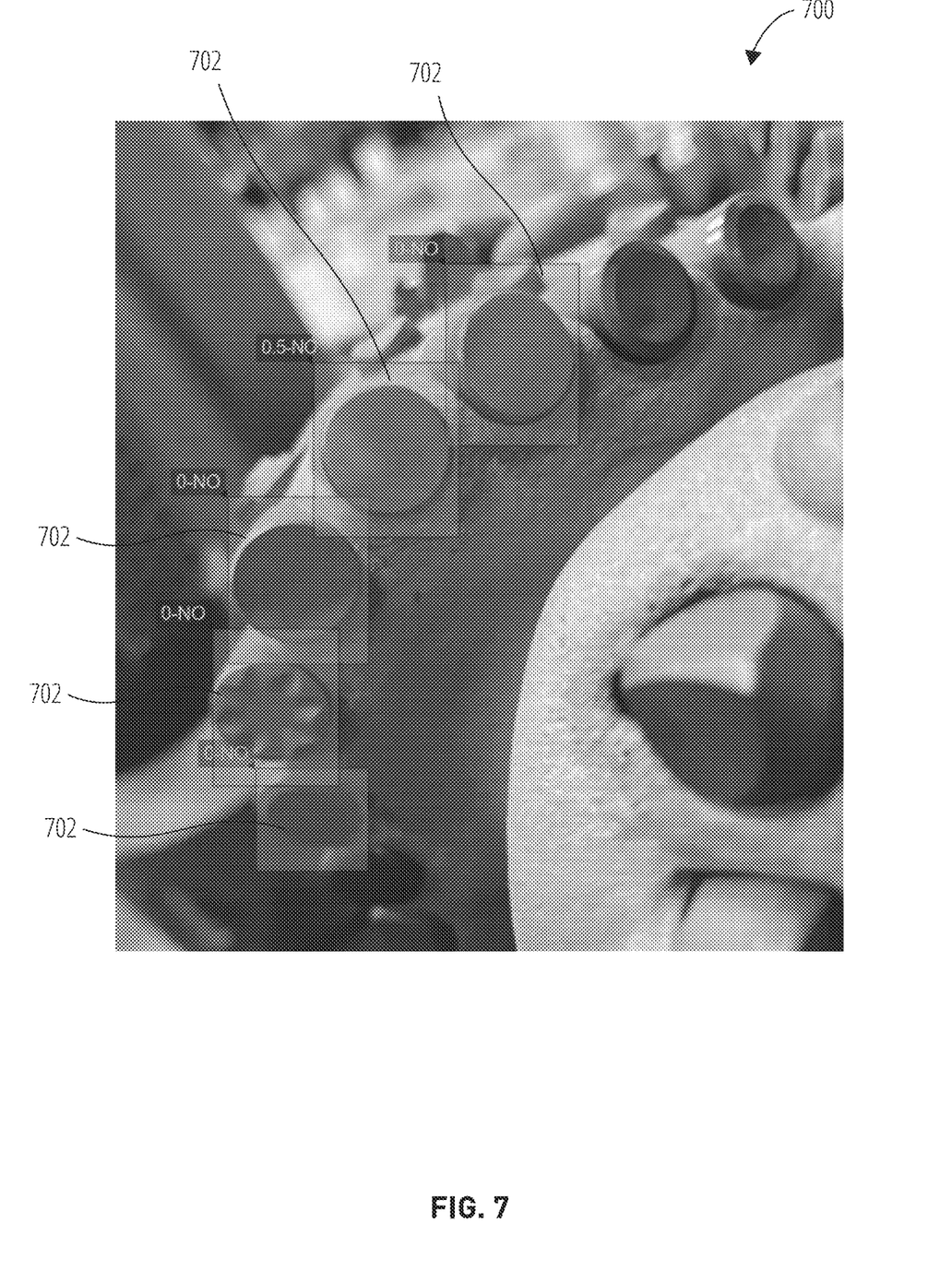
FIG. 7 illustrates an example generated image of an earth-boring tool including bounding boxes according to one or more embodiments of the present disclosure.

FIG. 7 is an example generated image 700 (e.g., an image captured by a user 102) of an earth-boring tool (e.g., earth-boring tool 108) depicting a plurality of bounding boxes 702. The bounding boxes may indicate a detected object represented in the generated image 700 responsive to the generated image 700 being subject to object detection.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 8 illustrates non-limiting examples of implementations of functional elements disclosed herein. In some examples, some or all portions of the functional elements disclosed herein may be performed by hardware specially configured for carrying out the functional elements.

FIG. 8 is a block diagram of circuitry 800 that, in some examples, may be used to implement various functions, operations, acts, processes, and/or methods disclosed herein. The circuitry 800 includes one or more processors (sometimes referred to herein as "processors 802") operably coupled to one or more data storage devices (sometimes referred to herein as "storage 804"). The storage 804 includes machine-executable code 806 stored thereon and the processors 802 include logic circuitry 808. The machine-executable code 806 includes information describing functional elements that may be implemented by (e.g., performed by) the logic circuitry 808. The logic circuitry 808 is adapted to implement (e.g., perform) the functional elements described by the machine-executable code 806. The circuitry 800, when executing the functional elements described by the machine-executable code 806, should be considered as special purpose hardware configured for carrying out functional elements disclosed herein. In some examples, the processors 802 may perform the functional elements described by the machine-executable code 806 sequentially, concurrently (e.g., on one or more different hardware platforms), or in one or more parallel process streams.

When implemented by logic circuitry 808 of the processors 802, the machine-executable code 806 is to adapt the processors 802 to perform operations of examples disclosed herein. For example, the machine-executable code 806 may adapt the processors 802 to perform at least a portion or a totality of the operations of sequence-flow diagram 200 of FIG. 2. As a specific, non-limiting example, the machine-executable code 806 may adapt the processors 802 to provide one or more positioning indicators to a user via an image capture device. As another non-limiting example, the machine-executable code 806 may adapt the processors to identify one or more features represented in a two-dimensional image of an earth-boring tool.

The processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 806 (e.g., software code, firmware code, hardware descriptions) related to examples of the present disclosure. It is noted that a general-purpose processor (may also be referred to herein as a host processor or simply a host) may be a microprocessor, but in the alternative, the processors 802 may include any conventional processor, controller, microcontroller, or state machine. The processors 802 may also be implemented as a combination of computing devices, such as a combination of a DSP and a microprocessor, a plurality of microprocessors, one or more microprocessors in conjunction with a DSP core, or any other such configuration.

In some examples, the storage 804 includes volatile data storage (e.g., random-access memory (RAM)), non-volatile data storage (e.g., Flash memory, a hard disc drive, a solid-state drive, erasable programmable read-only memory (EPROM), etc.). In some examples, the processors 802 and the storage 804 may be implemented into a single device (e.g., a semiconductor device product, a system on chip (SOC), etc.). In some examples, the processors 802 and the storage 804 may be implemented into separate devices.

In some examples, the machine-executable code 806 may include computer-readable instructions (e.g., software code, firmware code). By way of non-limiting example, the computer-readable instructions may be stored by the storage 804, accessed directly by the processors 802, and executed by the processors 802 using at least the logic circuitry 808. Also, by way of non-limiting example, the computer-readable instructions may be stored on the storage 804, transferred to a memory device (not shown) for execution, and executed by the processors 802 using at least the logic circuitry 808. Accordingly, in some examples, the logic circuitry 808 includes electrically configurable logic circuitry 808.

In some examples, the machine-executable code 806 may describe hardware (e.g., circuitry) to be implemented in the logic circuitry 808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description may be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples, the machine-executable code 806 may include an HDL, an RTL, a GL description, a mask level description, other hardware description, or any combination thereof.

In examples where the machine-executable code 806 includes a hardware description (at any level of abstraction), a system (not shown, but including the storage 804) may implement the hardware description described by the machine-executable code 806. By way of non-limiting example, the processors 802 may include a programmable logic device (e.g., an FPGA or a PLC) and the logic circuitry 808 may be electrically controlled to implement circuitry corresponding to the hardware description into the logic circuitry 808. Also, by way of non-limiting example, the logic circuitry 808 may include hard-wired logic manufactured by a manufacturing system (not shown but including the storage 804) according to the hardware description of the machine-executable code 806.

Regardless of whether the machine-executable code 806 includes computer-readable instructions or a hardware description, the logic circuitry 808 is adapted to perform the functional elements described by the machine-executable code 806 when implementing the functional elements of the machine-executable code 806. It is noted that although a hardware description may not directly describe functional elements, a hardware description indirectly describes functional elements that the hardware elements described by the hardware description are capable of performing.

The illustrations presented herein are not actual views of any drilling system, or any component thereof, but are merely idealized representations, which are employed to describe embodiments of the present invention.

As used herein, the terms "drill bit," and "earth-boring tool" each mean and include earth-boring tools for forming, enlarging, or forming and enlarging a borehole. Non-limiting examples of bits include fixed-cutter (drag) bits, fixed-cutter coring bits, fixed-cutter eccentric bits, fixed-cutter bi-center bits, fixed-cutter reamers, expandable reamers with blades bearing fixed cutters, and hybrid bits including both fixed cutters and rotatable cutting structures (roller cones).

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to,"

the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method comprising:
    obtaining a three-dimensional representation of an earth-boring tool;
    calculating one or more target image capture device positions relative to the three-dimensional representation of an earth-boring tool;
    providing, to a user via an image capture device, one or more positioning indicators configured to guide a user to position the image capture device at one of the one or more target image capture device positions relative to an earth-boring tool;
    generating a two-dimensional image of the earth-boring tool via the image capture device;
    performing object detection on the generated two-dimensional image of the earth-boring tool to generate one or more bounding boxes indicating a position of a geometrical feature of the earth-boring tool; and
    identifying one or more geometrical features of the earth-boring tool responsive to a comparison of the one or more bounding boxes and the one or more positioning indicators or data from the three-dimensional representation of an earth-boring tool.

2. The method of claim 1, further comprising:
    generating a two-dimensional overlay image responsive to projecting one or more features represented in the three-dimensional representation of an earth-boring tool onto a two-dimensional plane; and
    overlaying the two-dimensional overlay image over a real-time camera feed of the image capture device.

3. The method of claim 2, wherein the two-dimensional overlay image is generated in real-time based, at least in part, on a real-time camera feed of the image capture device.

4. The method of claim 2, wherein the one or more positioning indicators comprise one or more audible tones.

5. The method of claim 4, wherein the one or more audible tones are a series of audible tones and a frequency of the series of audible tones increases responsive to the image capture device moving closer to one of the one or more target image capture device positions.

6. The method of claim 1, wherein each of the one or more target image capture device positions include a target spatial position and target image capture device orientation relative to the three-dimensional representation of an earth-boring tool.

7. The method of claim 1, wherein providing, to a user via the image capture device, one or more positioning indicators comprises changing one or more elements presented at a display of the image capture device responsive to the image capture device coming within a predetermined threshold distance from one of the one or more target image capture device positions relative to the earth-boring tool.

8. The method of claim 1, wherein providing, to a user via the image capture device, one or more positioning indicators comprises providing a uniform color tint at a display of the image capture device responsive to the image capture device coming within a predetermined threshold distance from one of the one or more target image capture device positions relative to the earth-boring tool.

9. The method of claim 1, further comprising aligning one or more features of a three-dimensional representation of an earth boring tool to an earth-boring tool represented in a real-time camera feed of the image capture device.

10. The method of claim 1, further comprising:
    measuring one or more wear characteristics of at least one geometrical feature of the earth-boring tool responsive to the generated two-dimensional image of the earth-boring tool and the identified one or more geometrical features of the earth-boring tool.

11. The method of claim 1, wherein the three-dimensional representation of an earth-boring tool is based, at least in part, on one or more of an engineering design model or a three-dimensional scan of an earth-boring tool.

12. A system comprising:
    an earth-boring tool;
    an image capture device configured to obtain one or more two-dimensional images;
    at least one processor; and
    at least one non-transitory computer-readable storage medium storing instructions thereon that, when executed by the at least one processor, cause the system to:
        obtain a three-dimensional representation of an earth-boring tool;

calculate one or more target image capture device positions relative to the three-dimensional representation of an earth-boring tool; and provide, to a user via the image capture device, one or more positioning indicators configured to guide a user to position the image capture device at one of the one or more target image capture device positions relative to the earth-boring tool.

13. The system of claim 12, wherein the image capture device comprises a display configured to present a live-camera feed of the image capture device.

14. The system of claim 13, wherein the positioning indicators may include one or more of one or more audio tones, a two-dimensional image overlay presented on the display, one or more arrows presented on the display, one or more haptic feedback responses, one or more geometrical bounding boxes presented on the display, or one or more image processing filters presented on the display.

15. The system of claim 13, wherein the instructions stored on the at least one non-transitory computer-readable storage medium, when executed by the at least one processor, cause the system to:

automatically perform real-time object detection based, at least in part, on the live-camera feed of the image capture device; and provide one or more positioning indicators based, at least in part, on the real-time object detection.

16. The system of claim 13, wherein the one or more positioning indicators are in a form of a two-dimensional overlay provided to the display while the display is presenting the live-camera feed.

17. The system of claim 16, wherein the instructions stored on the at least one non-transitory computer-readable storage medium, when executed by the at least one processor, cause the system to:

perform real-time object detection based, at least in part, on the live-camera feed of the image capture device; and automatically capture an image via the image capture device responsive to a comparison of the two-dimensional overlay and the real-time object detection.

18. The system of claim 12, wherein the instructions stored on the at least one non-transitory computer-readable storage medium, when executed by the at least one processor, cause the system to:

generate one or more two-dimensional images;

identify one or more geometrical features of the earth-boring tool responsive to performing object detection on the one or more two-dimensional images; and measure one or more wear characteristics of at least one geometrical feature of the earth-boring tool based, at least in part, on the one or more two-dimensional images and the identified one or more geometrical features of the earth-boring tool.

19. The system of claim 18, further comprising associating the one or more wear characteristics with one or more geometrical features of the earth-boring tool based, at least in part, on the one or more two-dimensional images and the identified one or more geometrical features of the earth-boring tool.

20. A system comprising:

an earth-boring tool;

an image capture device configured to obtain one or more two-dimensional images, the image capture device comprising:

at least one processor; and at least one non-transitory computer-readable storage medium storing instructions thereon that, when executed by the at least one processor, cause the image capture device to:

obtain one or more positioning indicators configured to guide a user to position the image capture device relative to the earth-boring tool, the one or more positioning indicators corresponding to one or more physical features of the earth-boring tool; and provide the one or more positioning indicators to a user via the image capture device.

\* \* \* \* \*